United States Patent
Rassman

(10) Patent No.: US 10,327,458 B2
(45) Date of Patent: Jun. 25, 2019

(54) MEMORIAL ITEM FOR HUMAN REMAINS

(71) Applicant: James Rassman, Centerville, MA (US)

(72) Inventor: James Rassman, Centerville, MA (US)

(*) Notice: Subject to any disclaimer, the term of this patent is extended or adjusted under 35 U.S.C. 154(b) by 0 days.

(21) Appl. No.: 15/614,049

(22) Filed: Jun. 5, 2017

(65) Prior Publication Data
US 2018/0343892 A1    Dec. 6, 2018

(51) Int. Cl.
| | | |
|---|---|---|
| *A23K 10/20* | (2016.01) | |
| *A23K 10/26* | (2016.01) | |
| *A61G 17/007* | (2006.01) | |
| *E04H 13/00* | (2006.01) | |

(52) U.S. Cl.
CPC .............. *A23K 10/20* (2016.05); *A23K 10/26* (2016.05); *A61G 17/007* (2013.01); *E04H 13/008* (2013.01)

(58) Field of Classification Search
CPC ...... A61G 17/08; A61G 17/007; A61G 99/00; A23K 10/20; A23K 10/26; E04H 13/008; A01G 7/00; A01G 9/02
USPC ................... 27/1; 426/480; 47/66.6, 58.1 R; 428/542.4
See application file for complete search history.

(56) References Cited

U.S. PATENT DOCUMENTS

| | | | |
|---|---|---|---|
| 3,000,742 A | 9/1961 | Kuster | |
| 3,370,954 A | 2/1968 | Kuster | |
| 3,900,579 A | 8/1975 | Masuda et al. | |
| 4,442,215 A | 4/1984 | Vognsen et al. | |
| 4,454,162 A | 6/1984 | Schanze | |
| 4,759,943 A | 7/1988 | Ross, Jr. | |
| 5,799,488 A * | 9/1998 | Truong | A01G 9/1086 27/1 |
| 6,042,857 A | 3/2000 | Jones et al. | |
| 6,193,075 B1 | 2/2001 | Plas | |
| 7,610,663 B2 * | 11/2009 | Johnson, Sr. | E04H 13/008 27/1 |
| 7,716,796 B2 * | 5/2010 | Silva | H04N 7/18 27/1 |
| 7,931,806 B2 | 4/2011 | Logan et al. | |
| 2003/0228349 A1 | 12/2003 | Singh et al. | |
| 2011/0061293 A1 * | 3/2011 | Truong | A01C 11/00 47/58.1 SC |
| 2016/0000002 A1 * | 1/2016 | Bibaud | A01G 9/1086 47/56 |

FOREIGN PATENT DOCUMENTS

| | | |
|---|---|---|
| CN | 1537522 A * | 10/2004 |
| EP | 0243826 A2 | 11/1987 |

* cited by examiner

*Primary Examiner* — William L Miller
(74) *Attorney, Agent, or Firm* — Lambert Shortell & Connaughton; Gary E. Lambert; David J. Connaughton, Jr.

(57) ABSTRACT

A memorial item is provided which comprises a mixture of animal feed and cremated human remains in the form of ashes. The mixture is edible to animals, and is intended to allow a deceased to return to nature in a natural manner. The memorial feed item may be formed as a block for feed items such as a bird feeder or mineral lick, or may be pelletized for other animal feed.

15 Claims, 5 Drawing Sheets

MEMORIAL ITEM FOR HUMAN REMAINS

BACKGROUND OF THE INVENTION

Field of the Invention

The present invention relates generally to memorial items. More particularly, the present invention relates to memorial items containing cremated human remains integrated into an item that is consumable by animals or plants.

Description of Related Art

Cremation is a common practice to dispose of human remains. Typically, after cremation, the ashes (remains) of the deceased are either displayed in a decorative urn or other structure, or are scattered in nature, for example at a site important to the deceased. However, many of those who spend time communing with nature, among others, have a desire to be returned to nature upon death. Specifically, there is a desire among many for their remains to be returned to the animals that they closely associate with, hunt, fish, or otherwise enjoy.

Therefore, what is needed is a device for incorporating cremated human remains into a memorial item that may be consumed or otherwise returned to animals, plant life, and the like.

SUMMARY OF THE INVENTION

The subject matter of this application may involve, in some cases, interrelated products, alternative solutions to a particular problem, and/or a plurality of different uses of a single system or article.

In one aspect, a memorial item is provided. The memorial item is formed of a quantity of ashes of a cremated human combined with a quantity of animal or plant feed. The ashes and feed are mixed together to form an edible and/or decomposable composition and allows the remains of the deceased to return to nature by consumption by wildlife.

In another aspect, a memorial feed assembly is provided. The memorial assembly has a memorial item which has a quantity of ashes of a cremated human, and a quantity of animal feed mixed together. The memorial item has a composition of less than 25% ashes and the balance being animal feed. This memorial item is attached to a tree to form the memorial assembly.

DETAILED DESCRIPTION

Figure 1:
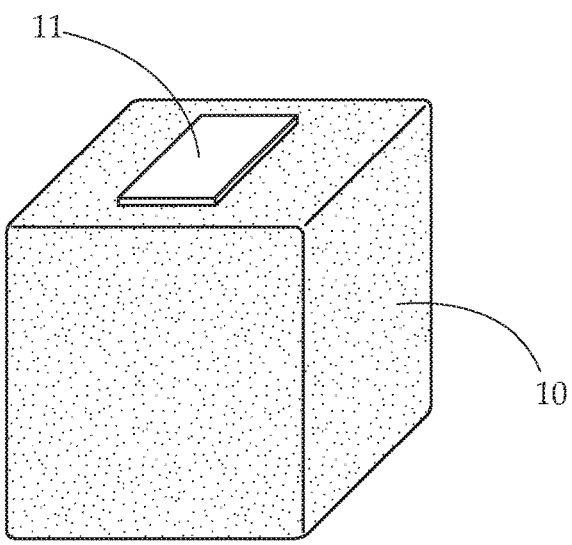
FIG. 1 provides a perspective view of an embodiment of the present invention.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a mixture of cremated human ashes (hereinafter "ashes") and an animal feed composition. Typically, the ashes are approximately uniformly distributed within this mixture. However, in other embodiments, the mixture may be formed as layers of animal feed and ash, ash coated with animal feed, or pellet feed with food outside of an ash center, among other alternative compositions. The feed and ashes mixture generally will be selected to match the deceased's lifestyle and interests, for example a bird hunter or birder may select a bird feed-ashes mixture, while a deer hunter may select deer feed or a mineral lick mixture. The mixture is then positioned in the environment or nature, or provided directly to animals, thereby returning the deceased to the nature that they so love.

The animal feed contemplated herein may be any composition that is edible and/or desirable by one of any different types of animals, such as mammals, birds, fish, and the like. Non-limiting examples of animal feeds may include, but are not limited to granular/pellet feed or feed blocks including corn based feed, grain based feed, animal feed comprising molasses, salt/mineral lick, fish food, bird feed mix, suet bird feed, and the like. In an alternative embodiment, the ashes may be integrated with a fertilizer to nourish plants. For example, ashes and fertilizer may be integrated into a fertilizer stake or pelletized fertilizer, which may also be contemplated by the term feed block as discussed herein.

It has been found that when mixing the ashes with the animal feed, generally compositions having less than approximately 25% by mass ashes, with the balance being animal feed, do not negatively impact the desirability of the animal feed product. Further, compositions with less than 25% total mass from ashes do not alter the material properties of the animal feed. However, higher ash compositions may be used in varying embodiments without straying from the scope of this invention. In one embodiment, less than approximately 15% of the total mass of the mixture may come from the ashes. In another embodiment, the animal feed mixture may include approximately 5-15% of the total mass of the feed mixture as ashes.

In some embodiments, the present invention may include a memorial plaque or other similar marker. The plaque may be integrated into the feed item, particularly when it is formed as a block or other unitary piece. In such embodiments, the memorial plaque may remain once the feed is consumed. In other embodiments, the memorial may be provided on a packaging of granular feed or bird fee. The memorial plaque may be formed of any material, such a plastic, metal, wood, composite materials, and the like.

In a fish feed embodiment, the present invention may further include a weighted block or base such that the memorial sinks to a bottom of a body of water for access by the fish. In a particular embodiment, the memorial plaque noted above may also serve as this weight.

In some embodiments, the ashes may be bonded or coated after cremation to stabilize the ashes. However, other than these processes (or no treatment at all), there is no treatment, such as a chemical treatment of the ashes. This is important to ensure that the remains of the deceased are not unnaturally damaged, transformed, or disrespected.

In an exemplary embodiment of production of the memorial item, initially a quantity of human cremated remains, in the form of ashes, is obtained. The ashes may be provided to the loved ones of the deceased, or may be directly transferred to be formed into the memorial item. It is important to note that, in most embodiments, the ashes are not treated in any way so as to not disturb their state as the human remains. Once received, the ashes may be incorporated into, and mixed with, any one of the above noted feed sources. Once the mixture is completed, it is formed into the desired feed source—typically one of a pellet/granular feed or a feed block. A plaque may be integrated into the feed, especially in the case of feed blocks, or attached to a base and then packaged for transfer to the loved ones. The loved one(s) or other operator may then bring the feed mixture into a place in nature, or to another area for the animal consumption to return the ashes to nature.

Turning now to FIG. 1, an embodiment of the present invention is shown. In this view, a quantity of animal feed 10 having the food and human ashes remains composition is formed into a block shape. It should be understood that depending on embodiment, the shape may be any shape without straying from the scope of this invention. Positioned on the feed block 10, and slightly recessed therein to create an approximately flush surface is a plaque 11. The plaque 11 may be a memorial plaque that contains markings indicating information about the deceased.

Figure 2:
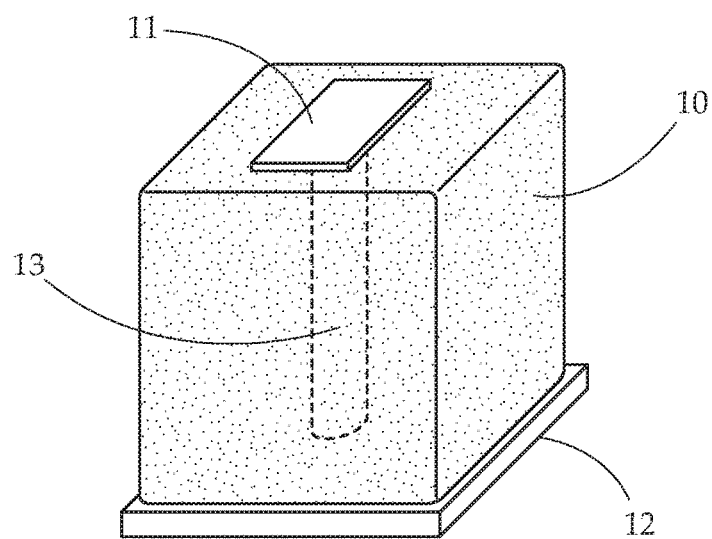
FIG. 2 provides a perspective view of another embodiment of the present invention.

FIG. 2 shows another embodiment of the present invention. In this embodiment, the feed block 10 is supported by a solid base 12. The base 12 may be formed of any material. In an embodiment where the feed block 10 is intended for fish or other aquatic animals, the base 12 may be weighted to ensure it sinks. Further, in this embodiment, the plaque 11 is connected to the base 12 by a connector 13, shown here as a column surrounded by the feed block 10.

Figure 3:
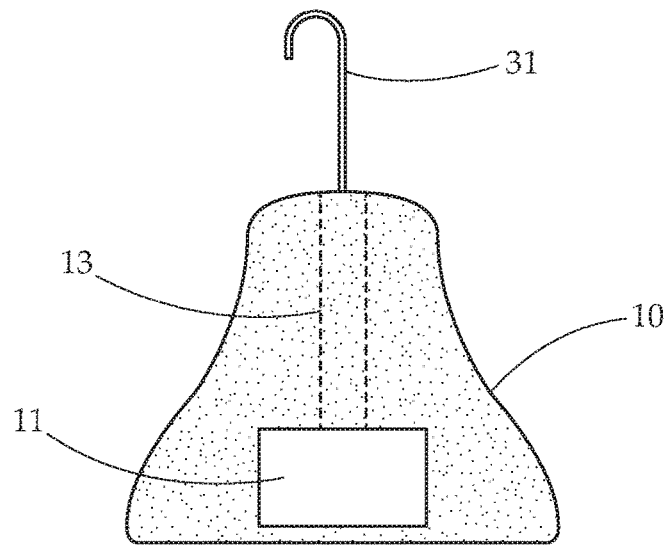
FIG. 3 provides a perspective view of yet another embodiment of the present invention.

FIG. 3 provides a view of another embodiment of the present invention formed as a bird feeder. In this view, the animal feed 10 is formed into a bell shaped block 10. A plaque 11 is positioned on the bottom of the block 10. The structure includes a hook 31 on top of the feed block 10 to allow it to be connected to, for example, a branch, and the like. Connecting the hook 31 to the plaque 11 is a connector 13 which may be surrounded or partially surrounded by the feed block 10.

Figure 4:
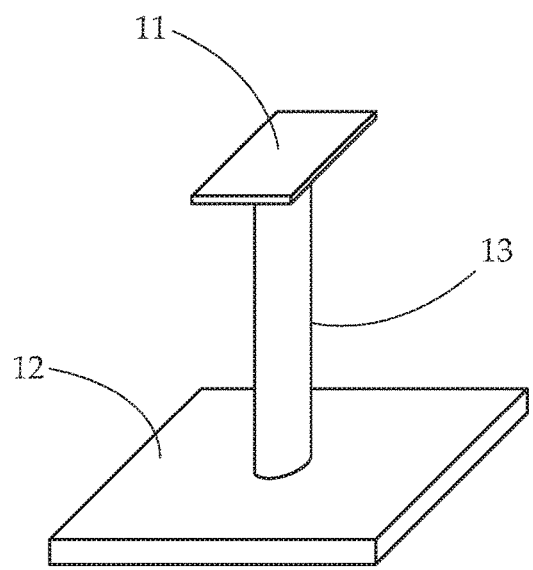
FIG. 4 provides a perspective view of an embodiment of the present invention having the ashes-feed composition removed.

FIG. 4 provides a view of an embodiment of the present invention after the food has been eaten away. In this view, base 12 is connected to the memorial plaque 11 by connector 13. In this view, connector 13 has a decorative feature. In some cases, connector 13 may be formed in a decorative shape, including being a decorative column, hyperbolic column, and the like. The present embodiment demonstrates how the invention can be used as a memorial even after the food and ashes composition has been consumed by nature.

Figure 5:
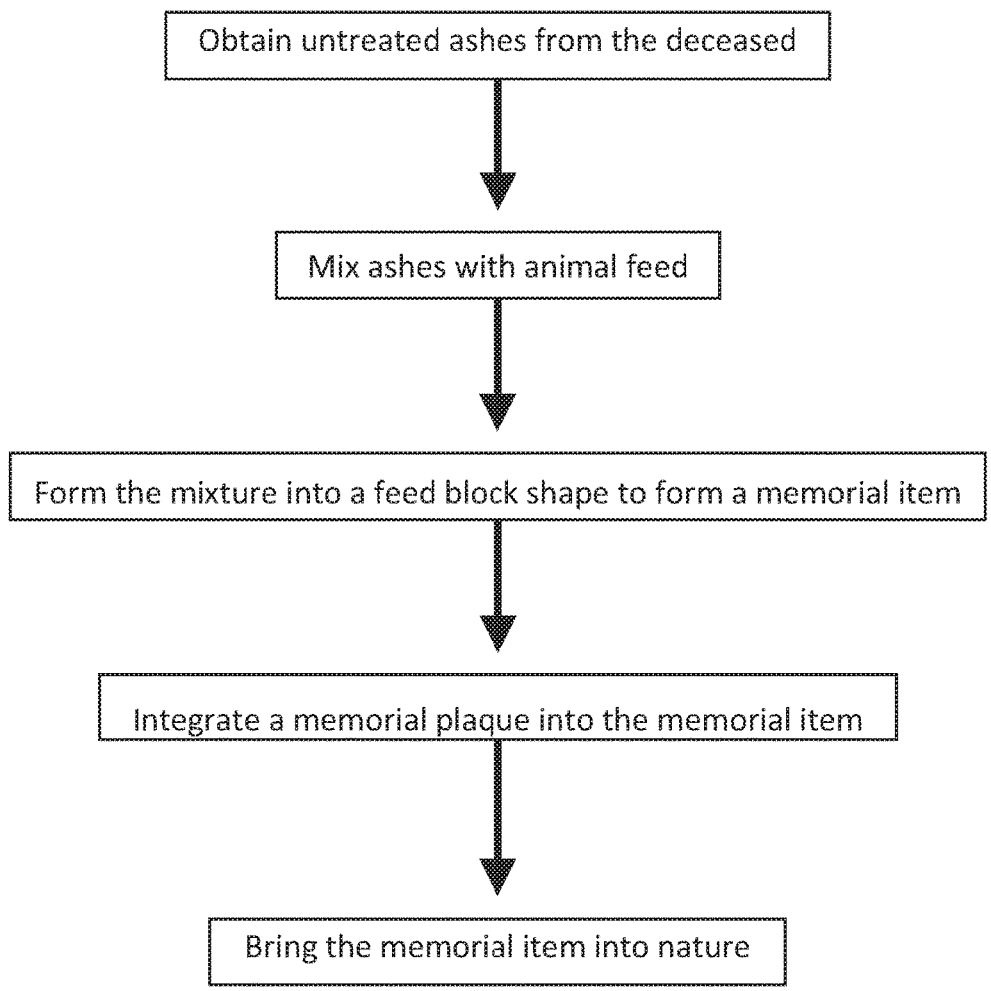
FIG. 5 provides a flow chart of an embodiment of a method of making the present invention.

FIG. 5 provides a view of an embodiment of the method of making the present invention. In this method, initially, a quantity of untreated ashes from a deceased is obtained. As noted above, the ashes may come immediately from the crematorium, or may be provided from the estate of the deceased. These ashes are then mixed with animal feed selected by either the deceased prior to death, loved ones, and/or the estate. The mixture is formed into a feed block shape (although may, in some embodiments, be a granular feed), thus forming the memorial item. The feed block may have a memorial plaque integrated or installed into or onto it. This memorial plaque, as discussed herein, may include markings regarding the deceased. Once completed, the memorial item may be taken into nature or a natural environment to finally return the deceased to nature.

Figure 6:
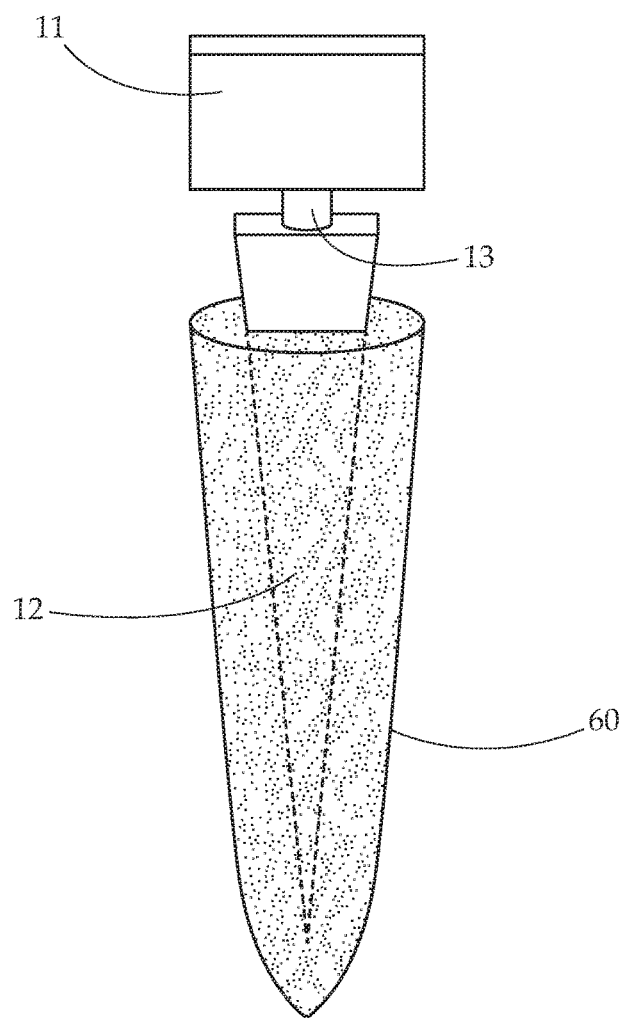
FIG. 6 provides a view of an embodiment of the present invention formed as a plant feed embodiment.

FIG. 6 provides a view of an embodiment of the present invention formed as a plant feed spike. In this embodiment, base 12 is formed as a spike. A plant food composition 60 is comprised of cremated human ashes mixed with a plant feed, which may vary depending on desired plant to feed. The plant food composition 60 is similarly shaped as a spike and at least partially surrounds the base 12. A shaft 13 connects memorial plaque 11 to the base 12. In use, the memorial item may be forced into the ground near or adjacent to a plant, and the plant feed 60 provides nutrients to the plant or plants it is adjacent to. The base 12 could also be surrounded by animal feed and driven into the ground after the feed was consumed.

Figure 7:
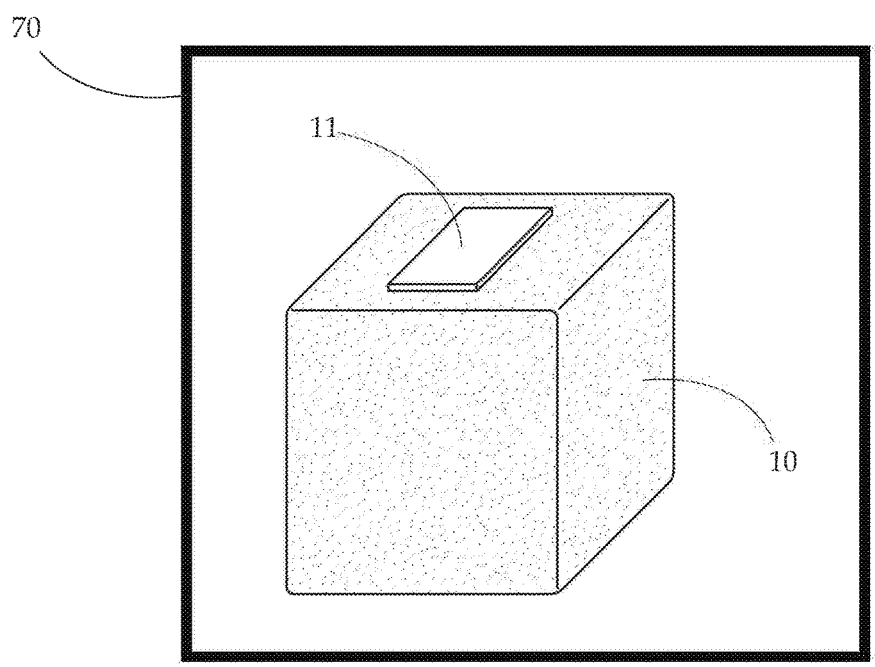
FIG. 7 provides a perspective view of another embodiment of the present invention.

FIG. 7 shows an embodiment of the present invention is shown having a packaging as the memorial marker. In this view, a quantity of animal feed 10 having the food and human ashes remains composition is formed into a block shape. It should be understood that depending on embodiment, the shape may be any shape without straying from the scope of this invention. Positioned on the feed block 10, and slightly recessed therein to create an approximately flush surface is a plaque 11, though it should be understood that this plaque 11 is not required in all embodiments. The plaque 11 may be a memorial plaque that contains markings indicating information about the deceased. A packaging 70 surrounds the edible composition and the memorial may be provided on a packaging.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A memorial item comprising:
   a quantity of ashes of a cremated human;
   a quantity of animal feed, wherein the quantity of animal feed is selected from the group consisting of fish food, pelletized animal feed, pellets comprising the quantity of animal feed on an exterior surrounding the quantity of cremated human ashes, suet bird feed, bird feed mix, mineral lick, corn-based feed, grain-based feed, animal feed comprising molasses, and deer feed; and
   wherein the cremated human ashes and animal feed are mixed together to form an edible composition of the memorial item.

2. The memorial item of claim 1 wherein the edible composition comprising the cremated human ashes and animal feed is formed into a block, the memorial item further comprising a base of a material different from the block, the base positioned on a bottom of the block.

3. The memorial item of claim 2 further comprising a memorial plaque connected to at least one of the block and the base.

4. The memorial item of claim 2 further comprising a memorial plaque, and a column passing through the block connecting the base to the memorial plaque, the memorial plaque being on a different side of the block from the base.

5. The memorial item of claim 1 wherein the ashes are uniformly distributed throughout the animal feed.

6. The memorial item of claim 1 wherein the cremated human ashes are untreated after cremation.

7. The memorial item of claim 1 wherein the cremated human ashes comprise less than 25% of the total mass of the memorial item.

8. The memorial item of claim 1 wherein the cremated human ashes comprise less than 15% of the total mass of the memorial item.

9. The memorial item of claim 1 wherein the cremated human ashes comprise between 5-15% of the total mass of the memorial item.

10. A memorial assembly comprising the memorial item of claim 1 wherein the memorial item is attached to a tree.

11. The memorial assembly of claim 10 wherein the memorial item is a bird feeder.

12. A memorial item comprising:
 a quantity of ashes of a cremated human;
 a quantity of animal feed;
 wherein the cremated human ashes and animal feed are mixed together to form an edible composition of the memorial item;
 a memorial marker connected to the edible composition; and
 wherein the memorial marker is a packaging.

13. The memorial item of claim 12 wherein the ashes are uniformly distributed throughout the animal feed.

14. A memorial item comprising:
 a quantity of ashes of a cremated human;
 a quantity of animal feed;
 wherein the cremated human ashes and animal feed are mixed together to form an edible composition of the memorial item;
 a memorial marker connected to the edible composition; and
 wherein the edible composition comprising the cremated human ashes and animal feed is formed into a block.

15. A memorial item comprising:
 a quantity of ashes of a cremated human;
 a quantity of plant feed;
 wherein the cremated human ashes and plant feed are mixed together to form a plant food composition of the memorial item;
 wherein the plant food composition comprising the cremated human ashes and plant feed is formed into a block, the memorial item further comprising a base of a material different from the block, the plant food composition surrounding at least a portion of the base; and
 further comprising a memorial marker on one end of the base.

* * * * *